United States Patent
Naveh et al.

(10) Patent No.: US 9,727,318 B2
(45) Date of Patent: Aug. 8, 2017

(54) TECHNIQUES TO IDENTIFY AND PURGE UNUSED CODE

(71) Applicant: Facebook, Inc., Menlo Park, CA (US)

(72) Inventors: Barak Reuven Naveh, Palo Alto, CA (US); Michael McKenzie Magruder, Carnation, WA (US)

(73) Assignee: FACEBOOK, INC., Menlo Park, CA (US)

( * ) Notice: Subject to any disclaimer, the term of this patent is extended or adjusted under 35 U.S.C. 154(b) by 215 days.

(21) Appl. No.: 14/182,769

(22) Filed: Feb. 18, 2014

(65) Prior Publication Data

US 2015/0234652 A1   Aug. 20, 2015

(51) Int. Cl.
G06F 9/45         (2006.01)
G06F 9/44         (2006.01)

(52) U.S. Cl.
CPC .............. G06F 8/4435 (2013.01); *G06F 8/70* (2013.01)

(58) Field of Classification Search
CPC .... G06F 8/70–8/72; G06F 8/77; G06F 8/4435
See application file for complete search history.

(56) References Cited

U.S. PATENT DOCUMENTS 6,247,175 B1 * 6/2001 Ledford ................ G06F 8/4435
                                                            717/107
6,671,876 B1 * 12/2003 Podowski ........... G06F 11/3409
                                                            714/E11.192
7,299,319 B2 * 11/2007 Dimpsey et al. ............. 711/125
7,353,503 B2    4/2008 Nair et al.
(Continued)

FOREIGN PATENT DOCUMENTS

WO    2007128974    11/2007
WO    2008112174    9/2008

OTHER PUBLICATIONS

Eder, S., et al., How much does unused code matter for maintenance?, 34th International Conference on Software Engineering (ICSE), Jun. 2-9, 2012, pp. 1102-1111, [retrieved on Mar. 25, 2017], Retrieved from the Internet: <URL:http://ieeexplore.ieee.org/>.*

(Continued)

*Primary Examiner* — Geoffrey St Leger

(57) ABSTRACT

An apparatus to identify and purge unused code may comprise a processor circuit on a device and a storage component configured to store a codebase including one or more portions of programming code. The apparatus may further comprise a sampling component, a profiling component, and a purge component. The sampling component may sample the codebase and generate one or more leads identifying portions of programming code from the codebase determined to be unused during a sampling period. The profiling component may receive the one or more leads and profile programming code identified therein during a profiling period and to identify portions of programming code determined to be unused during the profiling period. The purge component may receive identification of the portions of programming code determined to be unused during the profiling period and initiate a purging process thereon. Other embodiments are described and claimed.

21 Claims, 12 Drawing Sheets

(56) References Cited

U.S. PATENT DOCUMENTS

| | | | | |
|---|---|---|---|---|
| 7,596,601 | B2* | 9/2009 | Takami | G06Q 10/107 455/412.2 |
| 8,126,856 | B2* | 2/2012 | Sabsevitz et al. | 707/694 |
| 8,490,054 | B2* | 7/2013 | Dattathreya | 717/121 |
| 8,516,022 | B1* | 8/2013 | Kanteti et al. | 707/827 |
| 8,543,907 | B1 | 9/2013 | Roskind | |
| 8,949,803 | B2* | 2/2015 | Duftler et al. | 717/143 |
| 8,972,680 | B2* | 3/2015 | Burka | G06F 12/0253 711/162 |
| 2003/0182652 | A1* | 9/2003 | Custodio | 717/122 |
| 2004/0102185 | A1* | 5/2004 | Takami | G06Q 10/107 455/412.1 |
| 2004/0128660 | A1* | 7/2004 | Nair | G06F 8/4435 717/156 |
| 2005/0210452 | A1* | 9/2005 | Dimpsey et al. | 717/120 |
| 2006/0271596 | A1* | 11/2006 | Sabsevitz et al. | 707/200 |
| 2007/0033659 | A1 | 2/2007 | Hoche et al. | |
| 2007/0226700 | A1 | 9/2007 | Gal et al. | |
| 2009/0036163 | A1* | 2/2009 | Kimbrell | H04M 1/2745 455/558 |
| 2010/0005457 | A1* | 1/2010 | Komatsu | G06F 8/4435 717/145 |
| 2012/0215819 | A1* | 8/2012 | Gowdra | 707/822 |
| 2012/0222020 | A1* | 8/2012 | Duftler et al. | 717/143 |
| 2013/0055278 | A1* | 2/2013 | Zaitsev | G06F 9/5022 718/104 |
| 2013/0080997 | A1* | 3/2013 | Dattathreya | 717/121 |
| 2013/0191610 | A1* | 7/2013 | Burka | G06F 12/0253 711/206 |
| 2014/0181443 | A1* | 6/2014 | Kottomtharayil | G06F 11/1458 711/162 |

OTHER PUBLICATIONS

UCDetector: Unnecessary Code Detector, Apr. 5, 2012, 4 pages, [retrieved on Mar. 25, 2017], Retrieved from the Internet: <URL:http://web.archive.org/web/20120405010419/http://www.ucdetector.org>.*

Cleanscape C++lint User's Guide Version 3.1, Cleanscape software international, 2010, 45 pages, [retrieved on Jul. 2, 2015], Retrieved from the Internet: <URL:https://stellar.cleanscape.net/docs_lib/cp-plint_guide.pdf>.*

Wikipedia—"Dead Code Elimination", retrieved Oct. 31, 2013 from <http://en.wikipedia.org/wiki/Dead_code_elimination>, 3 pages, author unknown.

* cited by examiner

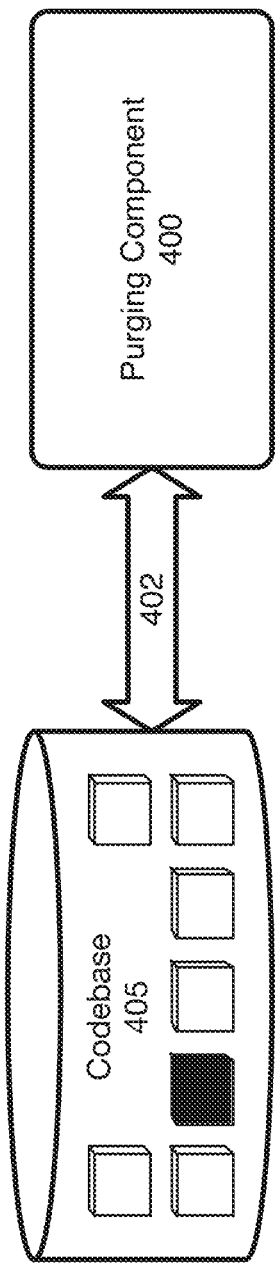
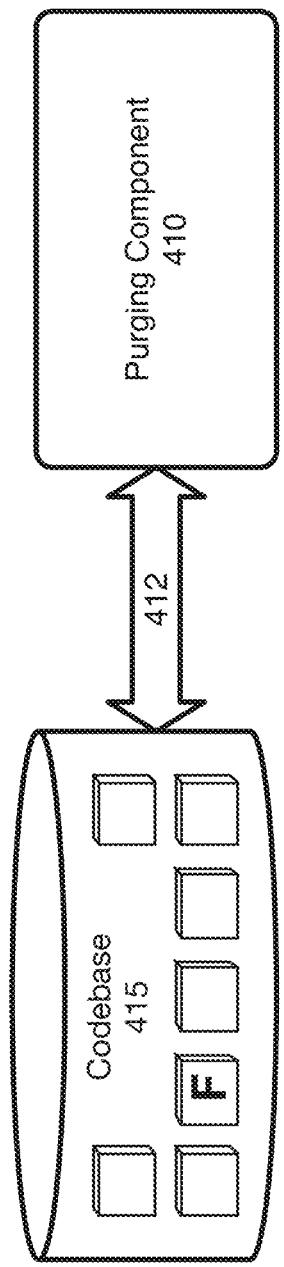
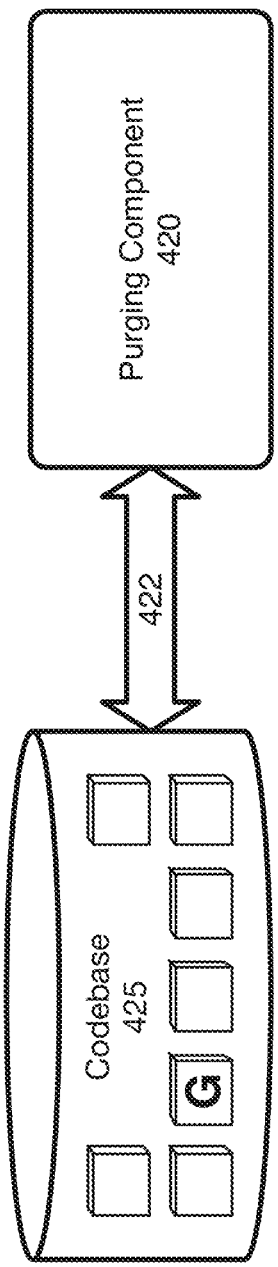
FIG. 4A
FIG. 4B
FIG. 4C

TECHNIQUES TO IDENTIFY AND PURGE UNUSED CODE

BACKGROUND

Modern software and web-based services may comprise a codebase including hundreds of thousands or millions of lines of programming code. Certain portions of code may be associated with particular software features. For example, in a web service, a portion of code may be dedicated to changing a user setting, accessing a feature of a chat service, or modifying an uploaded photo. Maintaining a codebase is essential to operating a software product, as extraneous or unorganized code may prevent detection of problems with the software and hinder solutions to problems that arise. Thus, detecting and purging code that is no longer being used may be desirable. With a significant amount of code, it may be quite difficult to manually locate code that is no longer being accessed. Multiple features may share a particular code function, thus, removal of a feature from software may not necessarily indicate that the code is safe to be deleted. Further, it may be difficult to determine based upon a review of the code alone whether the software is actively accessing particular portions of code. Thus, improved techniques for identification and purging of unused code are needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for identifying and purging unused code. Some embodiments are particularly directed to techniques for determining leads for potentially unused code and confirming that the code identified by the leads is unused through profiling the code based upon requests from one or more users of an online service for services provided by the online service. In one embodiment, for example, an apparatus may comprise a processor circuit on a device and a storage component configured to store a codebase including one or more portions of programming code. The apparatus may further comprise a sampling component, a profiling component, and a purging component. The sampling component may be operative on the processor circuit to sample the codebase and generate one or more leads identifying portions of programming code from the codebase determined to be unused during a sampling period. The profiling component may be operative on the processor circuit to receive the one or more leads and determine whether programming code identified therein is executed by requests from one or more client devices during a profiling period. The purging component may be operative on the processor circuit to receive the portions of programming code determined to be unused during the profiling period and initiate a purging process thereon. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4A illustrates a first embodiment of a purging process.

FIG. 4B illustrates a second embodiment of a purging process.

FIG. 4C illustrates a third embodiment of a purging process.

DETAILED DESCRIPTION

Figure 1:
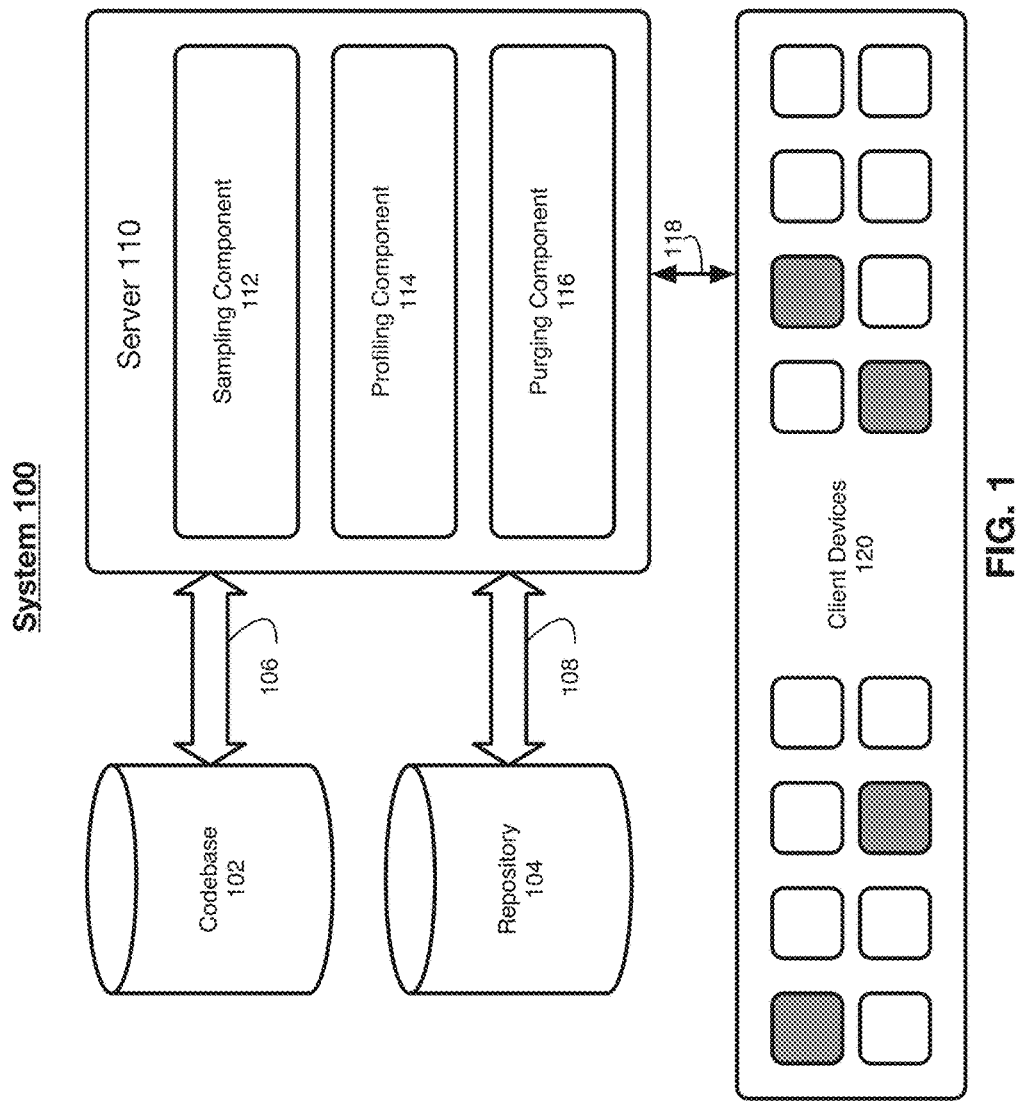
FIG. 1 illustrates an embodiment of a system to identify and purge unused code.

Various embodiments are generally directed to techniques for identifying and purging unused code. Some embodiments are particularly directed to techniques for determining leads for potentially unused code through sampling and confirming that the code identified by the leads is unused through profiling the code during a profiling period. In one embodiment, for example, an apparatus may comprise a processor circuit on a device and a storage component configured to store a codebase including one or more portions of programming code. The apparatus may further comprise a sampling component, a profiling component, and a purging component. The sampling component may be operative on the processor circuit to sample the codebase and identify one or more leads identifying portions of programming code from the codebase determined to be unused during a sampling period. The profiling component may be operative on the processor circuit to receive the one or more leads and profile programming code identified therein during a profiling period. The profiling component may be further operative on the processor circuit to identify portions of programming code determined to be unused during the profiling period. The purging component may be operative on the processor circuit to receive identification of the portions of programming code determined to be unused during the profiling period and initiate a purging process thereon. Other embodiments are described and claimed.

In some embodiments, the sampling component may be configured to efficiently detect potential leads for unused code, while ignoring code that has been confirmed as used in the recent past. For example, the sampling component may be configured to, during sampling, skip portions of programing code from the codebase that have been used within a predetermined time period. In other words, if a particular portion of code has recently been confirmed as used, it may be flagged or designated as used for a period of time. A timestamp, timer, or other timing mechanism may be used to indicate how long ago a portion of code was last used. If the code has been used within a predetermined period of time, ranging from seconds to days based upon particular implementations, the sampling component may be configured to skip that portion of code during the sampling procedure. In this manner, the sampling component may focus on portions of code where usage is unknown.

In some software, code may be deployed into a codebase but not released for public consumption. For example, a web service may deploy code in the codebase for a new feature so that it may be tested internally or while other features are finalized. During this time, the unreleased code may not be accessed by users of the web service. To prevent unreleased code from being identified as a lead for potentially unused code, it may be flagged as unreleased in a manner such that the sampling component skips the unreleased code during the sampling procedure.

In an embodiment, the purging process may be configured in a variety of ways. For example, once a portion of code has been identified as unused, the purging component may either automatically purge the code, or may flag the code for manual deletion. Portions of code may be categorized based on a variety of factors such as importance, last used, dependencies, and/or size, among others. Using these categorizations, the purging component may determine whether automatic or manual purging is appropriate. During automatic deletion, the purging component may replace purged code with a marker, or "tombstone," indicating that a portion of code was deleted. In this manner, subsequent review of the code will indicate that code was automatically purged. The marker may include information directing a reviewer to a repository of code. Such information may include identifiers that may be used to locate the code itself or a last-known author of the code. In this manner, if a problem were to arise due to the purging on the code, it may be replaced.

In some embodiments, it may be appropriate for the purging component to perform an extra step to confirm that code is, in fact, unused. For example, once code has been identified as unused during the sampling period and the profiling period, the purging component may associate a gate with the code rather than automatically purging the code or flagging it for manual deletion. Such a gate may be set for a fixed period of time, thirty days for example, however, any time period may be used based upon design and implementation preferences. During this time, the gate may be configured to save an indication that the code has been accessed, or alert the purging component that the code has been accessed, or both. In this manner, further confirmation that code is unused may be obtained prior to purging. After expiration of the chosen time period, the purging component may then proceed to automatically delete the code or flag it for manual deletion.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise one or more components. Although the system 100 shown in FIG. 1 has a limited number of elements in a certain topology, it may be appreciated that the system 100 may include more or less elements in alternate topologies as desired for a given implementation. The system 100 may include a server 110, which may be generally operative to interact with a codebase 102, repository 104, and client devices 120. Server 110 may include one or more processing units, storage units, network interfaces, or other hardware and software elements described in more detail below.

In an embodiment, codebase 102 may comprise a device, such as a server, comprising a network-connected storage device or multiple storage devices, such as one of the storage devices described in more detail herein. Codebase 102 may store one or more portions of programming code, or source code, which may be used by one or more servers to deliver software or web services to client devices 120. Programming code may include, but is not limited to code of various programming languages such as C, C++, Objective-C, Python, Java, JavaScript, XML, HTML, Ruby, or PHP, for example. Of course, one of skill in the art will readily appreciate that codebase 102 may store code in various forms and programming languages. Server 110 may interact with codebase 102 over interface 106, which may include one or more of the interfaces described herein.

In an embodiment, repository 104 may comprise a device, such as a server, comprising a network-connected storage device or multiple storage devices, such as one of the storage devices described in more detail herein. Repository 104 may be operative to store versioning information for code, which may be represented as file comparisons, or diffs, illustrating changes in code over time. Repository 104 may include one of various revision control software applications routinely used in the art. In addition, repository 104 may include information related to the owner of a particular portion of code at a particular time. For example, a diff file may indicate that a portion of code was created on Sep. 1, 2011 by User A, was modified by User B on Dec. 29, 2012, and was most recently modified by User C on Aug. 8, 2013. One or more components of server 110 may use this information for sampling, profiling, and purging, for example. Server 110 may interact with repository 104 over interface 108, which may include one or more of the interfaces described herein.

In an embodiment, client devices 120 may include one or more devices used to access software or web services provided by server 110. For example, client devices 120 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a wearable computing device such as a smart watch, a server, a server array or server farm, a web server, a network server, an Internet server, a work station, a mini-computer, a mainframe computer, a supercomputer, a network appliance, a web appliance, multiprocessor systems, processor-based systems, or any combination thereof. For large web services, such as social networks, client devices 120 may include millions or billions of devices associated with users of the service. Server 110 may interact with client devices 120 over interface 118, which may include one or more of the interfaces described herein. The embodiments are not limited in this context.

In various embodiments, codebase 102, repository 104, server 110, and computing devices 120 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 100, and components and/or modules within a device of system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, codebase 102, repository 104, server 110, and client devices 120 of the system 100 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

In an embodiment, server 110 may include sampling component 112, which may be operative on a processor circuit of server 110 to sample the codebase 102 and generate one or more leads identifying portions of programming code from the codebase 102 determined to be unused during a sampling period. Sampling may be performed using one or more known sampling or profiling techniques, for example, instrumentation profiling, flat profiling, call-graph profiling, input-sensitive profiling, event-based profiling, or statistical profiling. Sampling component 112 may use one or more sampling or profiling techniques to generate a series of leads identifying code that has not been recently used. During the sampling period, program behavior may be monitored during periods of time and program activity, including whether portions of code have been used, may be collected. Information that may be collected may include functions called, function call times, or frequency of calls, for example. The embodiments are not limited in this context.

Sampling component 112 may be implemented in a variety of ways. For example, sampling component may be manually programmed into existing code, automatically run using a tool outside of existing code, implemented using an intermediary language such as assembly language, run during a compiler operations, or executed before or during runtime. The embodiments are not limited in this context.

In some embodiments, sampling component 112 may be configured to detect potential leads for unused code, while ignoring code that has been confirmed as used in the recent past. For example, sampling component 112 may be configured to, during sampling, skip portions of programing code from codebase 102 that have been used within a predetermined time period. In other words, if a particular portion of code has recently been confirmed as used, it may be flagged or designated as used for a period of time. A timestamp, timer, or other timing mechanism may be used to indicate how long ago a portion of code was last used. If the code has been used within a predetermined period of time, ranging from seconds to days based upon particular implementations, sampling component 112 may be configured to skip that portion of code during the sampling procedure. In this manner, sampling component 112 may identify portions of code where usage is unknown as potential leads.

In some software, code may be deployed into codebase 102 but not released for public consumption. For example, a web service may deploy code in codebase 102 for a new feature so that it may be tested internally or while other features are finalized. During this time, the unreleased code may not be accessed by users of the web service. To prevent unreleased code from being identified as a lead for potentially unused code, it may be flagged as unreleased in a manner such that sampling component 112 skips the unreleased code during sampling.

In an embodiment, server 110 may include profiling component 114, which may be operative on the processor circuit to receive the one or more leads and profile programming code identified therein on one or more servers during a profiling period. In this manner, profiling component 114 may monitor execution of the code on the servers as users of an online server make requests. Profiling component 114 may be further operative on the processor circuit to identify portions of programming code determined to be unused during the profiling period. For example, profiling component may profile code on server 110 as it is accessed by one or more of client devices 120 over a predetermined period of time. In this manner, profiling component may provide further evidence that particular portions of code are unused.

During profiling, code identified by leads generated by sampling component 112 may be profiled on server 110 based upon requests from one or more users over a period of time. The period of time may be predetermined and, in some embodiments, may be automatically or manually adjusted based upon a variety of factors such as the number of client devices, the type of code being profiled, and performance criteria such as network speed or preferred network performance. If code is not used during the profiling period, it may be assumed that the code is unused.

While client devices 120 show a limited number of devices, it can be appreciated that many more client devices may be used. For example, in a large social network, hundreds of millions of client devices may access one or more servers during a profiling period, such as server 110, server 210, or servers 1240, discussed herein. Since the profiling procedure may include performance overhead, it may be desirable to profile only during requests from a subset of client devices. Thus, as illustrated within FIG. 1, a subset of client devices 120 (indicated by shading) may be identified as candidates for profiling and profiling may be performed only using requests from the subset of client devices. In some embodiments, it may be desirable to modify how many client devices are used during the profile period, and in some situations, all client devices 120 may be used.

In an embodiment, server 110 may include purging component 116, which may be operative on the processor circuit to initiate a purging process on the portions of programming code determined to be unused during the profiling period. The purging process may be configured in a variety of ways. For example, once a portion of code has been identified as unused, purging component 116 may either automatically purge the code, or may flag the code for manual deletion. Portions of code may be categorized based on a variety of factors such as importance, last used, dependencies, and/or size, among others. Using these categorizations, the purging component may determine whether automatic or manual purging is appropriate. During automatic deletion, the purging component may replace purged code with a marker, or "tombstone," indicating that a portion of code was deleted. In this manner, subsequent review of the code will indicate that code was automatically purged. The marker may include information directing a reviewer to a repository of code, such as repository 104. Such information may include identifiers that may be used to locate the code itself or a last-known author of the code. In this manner, if a problem were to arise due to the purging of the code, it may be fixed or replaced.

In some embodiments, it may be appropriate for the purging component to perform an extra step to confirm that code is, in fact, unused. For example, once code has been identified as unused during the sampling period and the profiling period, purging component 116 may associate a gate with the code rather than automatically purging the code or flagging it for manual deletion. Such a gate may be set for a fixed period of time, thirty days for example, however, any time period may be used based upon design and implementation preferences. During this time, the gate may be configured to save an indication that the code has been accessed, or alert purging component 116 that the code has been accessed, or both. In this manner, further confirmation that code is unused may be obtained prior to purging. After expiration of the chosen time period, purging component 116 may then proceed to automatically delete the code or flag it for manual deletion.

Figure 2:
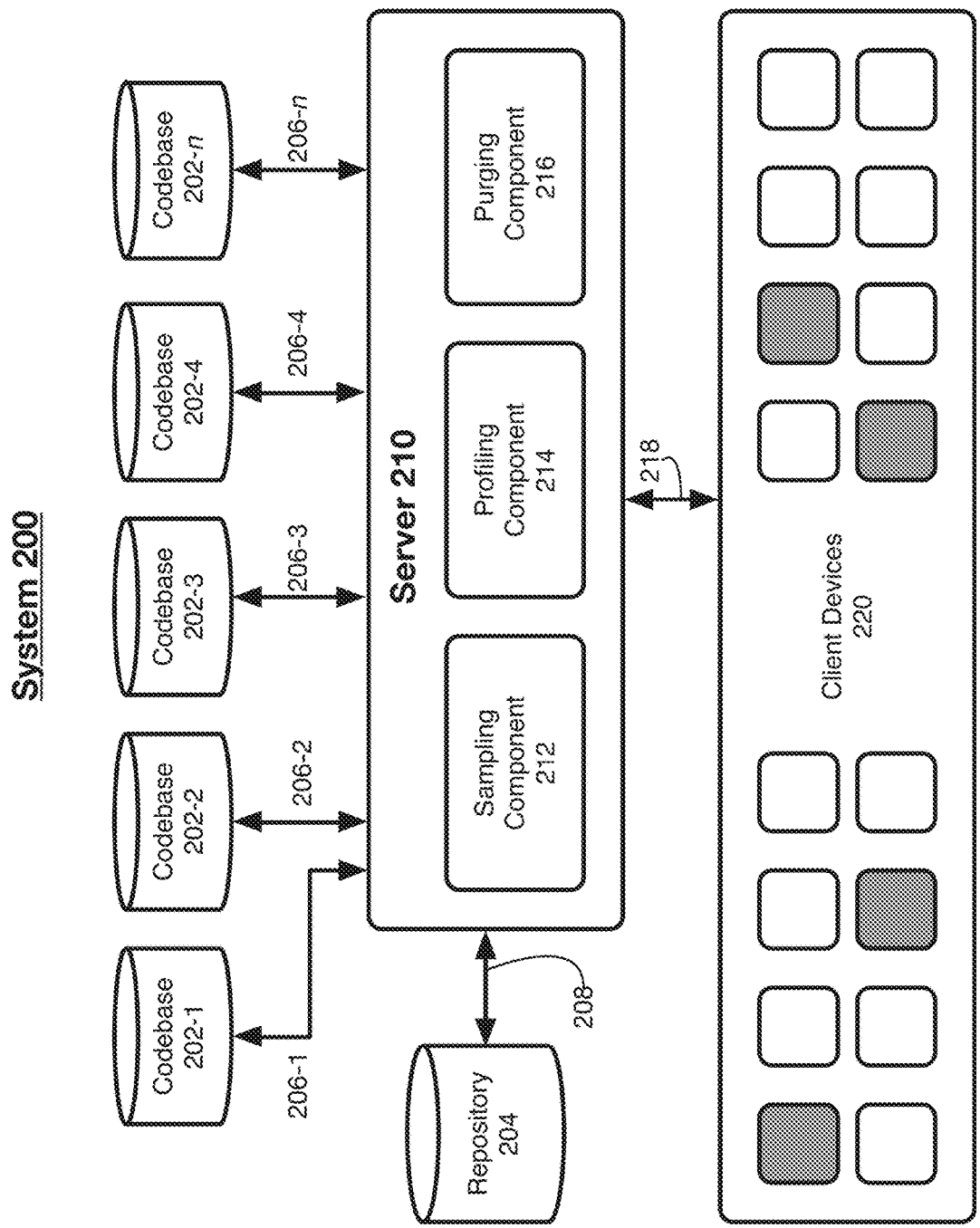
FIG. 2 illustrates an embodiment of a system to identify and purge unused code.

FIG. 2 illustrates a block diagram for a system 200. In one embodiment, the system 200 may comprise one or more components. Although the system 200 shown in FIG. 2 has a limited number of elements in a certain topology, it may be appreciated that the system 200 may include more or less elements in alternate topologies as desired for a given implementation. The system 200 may include a server 210, which may be generally operative to interact with a codebase 202-1-$n$ over interfaces 206-1-$n$. It is worthy to note that "a" and "b" and "c" and similar designators as used herein are intended to be variables representing any positive integer. Thus, for example, if an implementation sets a value for a=10, then a complete set of packets 130-$a$ may include components 130-1, 130-2, 130-3, 130-4, 130-5, 130-6, 130-7, 130-8, 130-9, and 130-10. The embodiments are not limited in this context and it will be appreciated that in various embodiments different values of a and other designators may be used.

In an embodiment, some elements of system 200, such as server 210, sampling component 212, profiling component 214, purging component 216, repository 204, client devices 220, interface 208, and interface 218 may correspond with similarly numbered counterparts of FIG. 1. However, as illustrated within FIG. 2, multiple codebases 202 may be used to provide distributed access to an online service. In an example, each of codebases 106 may include code for different features of an online service. In another example, some codebase servers may contain redundant code, which may provide load balancing and, in case of failure, may help to prevent downtime for an online service. When redundancy is used in this manner, the sampling component 212 and profiling component 214 may be configured to skip redundant code that has already been sampled or profiled, and purging component 216 may be configured to initiate a purging process on all instances of code that has been determined to be unused.

Figure 3:
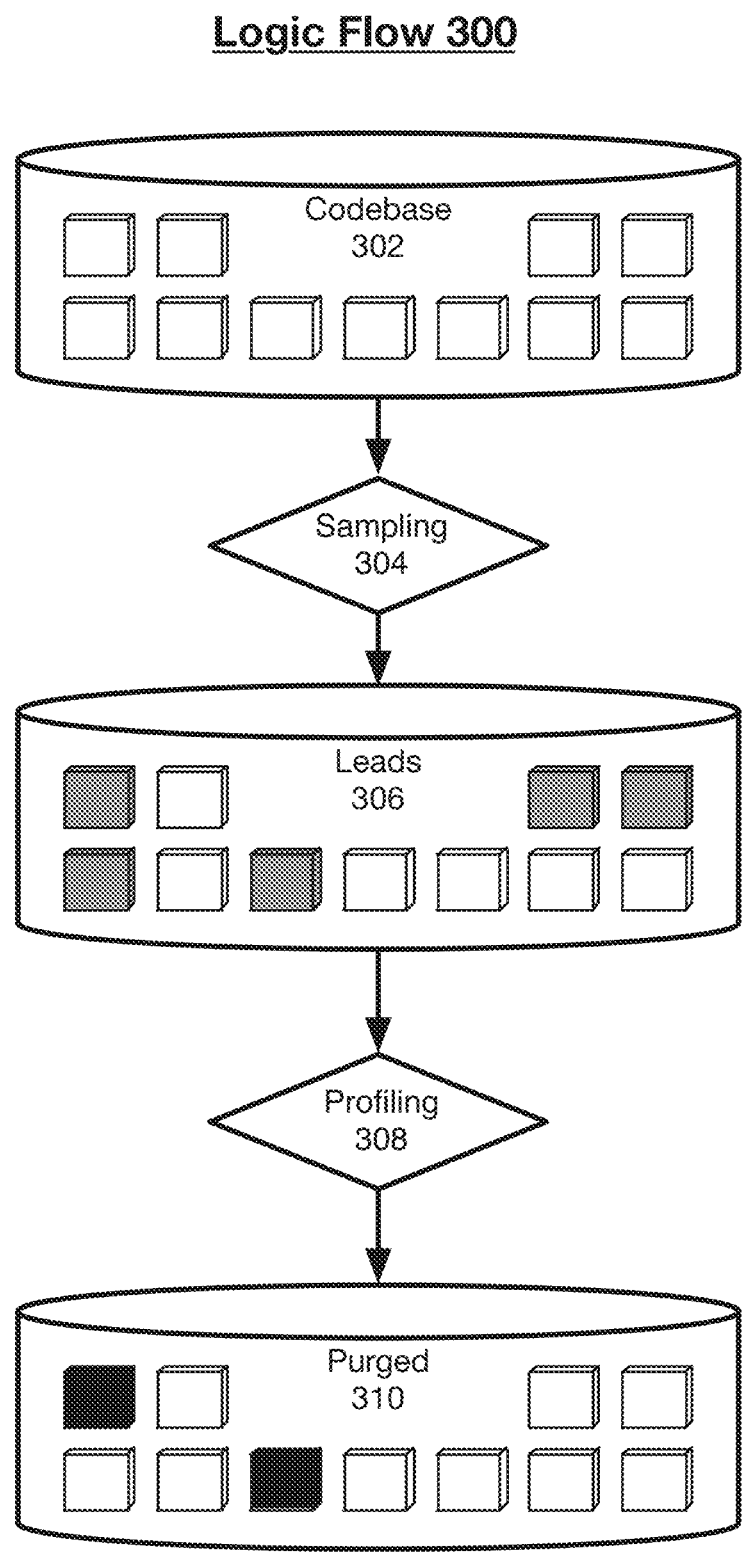
FIG. 3 illustrates a logic flow for identifying and purging unused code.

FIG. 3 illustrates a logic flow for identifying and purging unused code. Specifically, logic flow 300 illustrates the identification and purging of code within a codebase 302, such as codebase 102, described above. Codebase 302 may include one or more portions of code, which may include one or more lines of code. Portions of code may represent particular software functions or features, for example. At sampling stage 304, one or more portions of code may be identified by a sampling component, such as sampling component 112. During sampling, one or more portions of code may be identified as leads 306, which are illustrated as lightly shaded blocks. Leads 306 may be generated using one or more sampling techniques described herein, such as determining whether a portion of code has been recently marked as used. While FIG. 3 illustrates a subset of code as being identified as a lead, all code, or no code, of a particular codebase may be identified as a lead.

Once determined, leads 306 may be stored and sent, or otherwise communicated to a profiling component, such as profiling component 114, at 308. As described above with respect to FIG. 1, a profiling component such as profiling component 114, may be operative to perform profiling with respect to leads generated by a sampling component. For example, a profiling component may profile code identified by the leads on one or more servers for a predetermined period of time, as discussed above. In this manner, profiling component may provide further evidence that particular portions of code are unused. Code that has been verified by a profiling component as unused may be identified to a purging component, such as purging component 116, which may purge the unused code according to the purging techniques described herein. As illustrated, purged code 310 is shown as blackened blocks. Purged code 310 has been illustrated as a subset of leads 306, but may include all or none of the code identified as a lead.

FIG. 4A illustrates a first embodiment of a purging process. In an embodiment, purging component 400 may be operative to receive identification of portions of programming code of codebase 405 determined to be unused during a profiling period and initiate a purging process thereon. The purging process may be configured in a variety of ways. For example, once a portion of code has been identified as unused, purging component 400 may automatically purge the code, as illustrated and indicated by the blackened purged code in codebase 405. The decision to automatically delete the code may be based upon a categorization of the code being purged. Portions of code may be categorized based on a variety of factors such as importance, last used, dependencies, and/or size, among others. Using these categorizations, purging component 400 may determine whether automatic or manual purging is appropriate. During automatic deletion, the purging component may replace purged code with a marker, or "tombstone," indicating that a portion of code was deleted. In this manner, subsequent review of the code will indicate that code was automatically purged. The marker may include information directing a reviewer to a repository of code, such as repository 104. Such information may include identifiers that may be used to locate the code itself or a last-known author of the code. In this manner, if a problem were to arise due to the purging of the code, it may be replaced.

FIG. 4B illustrates a second embodiment of a purging process. In an embodiment, purging component 410 may be operative to receive identification of portions of programming code of codebase 415 determined to be unused during a profiling period and initiate a purging process thereon. The purging process may be configured in a variety of ways. For example, once a portion of code has been identified as unused, purging component 410 may flag code for manual deletion, as illustrated and indicated by the flag 'F' in codebase 415. Once flagged, the owner of code may be looked up in a repository and the owner may be notified, either manually or automatically. The decision to manually delete the code may be based upon a categorization of the code being purged. Portions of code may be categorized based on a variety of factors such as importance, last used, dependencies, and/or size, among others. Using these categorizations, purging component 410 may determine whether automatic or manual purging is appropriate. During manual deletion, the purging component may replace purged code with a marker, or "tombstone," indicating that a portion of code was deleted. In this manner, subsequent review of the code will indicate that code was manually purged. The marker may include information directing a reviewer to a repository of code, such as repository 104. Such information may include identifiers that may be used to locate the code itself or a last-known author of the code. In this manner, if a problem were to arise due to the purging of the code, it may be replaced.

FIG. 4C illustrates a third embodiment of a purging process. In some embodiments, it may be appropriate for purging component 420 to perform an extra step to confirm that code within codebase 425 is, in fact, unused. For example, once code has been identified as unused during the sampling period and the profiling period, purging component 420 may associate a gate 'G' with the code rather than automatically purging the code or flagging it for manual deletion. Such a gate may be set for a fixed period of time, thirty days for example, however, any time period may be used based upon design and implementation preferences. During this time, the gate may be configured to save an indication that the code has been accessed, or alert purging component 420 that the code has been accessed, or both. In this manner, further confirmation that code is unused may be obtained prior to purging. After expiration of the chosen time period, purging component 420 may then proceed to automatically delete the code or flag it for manual deletion.

Figure 5:
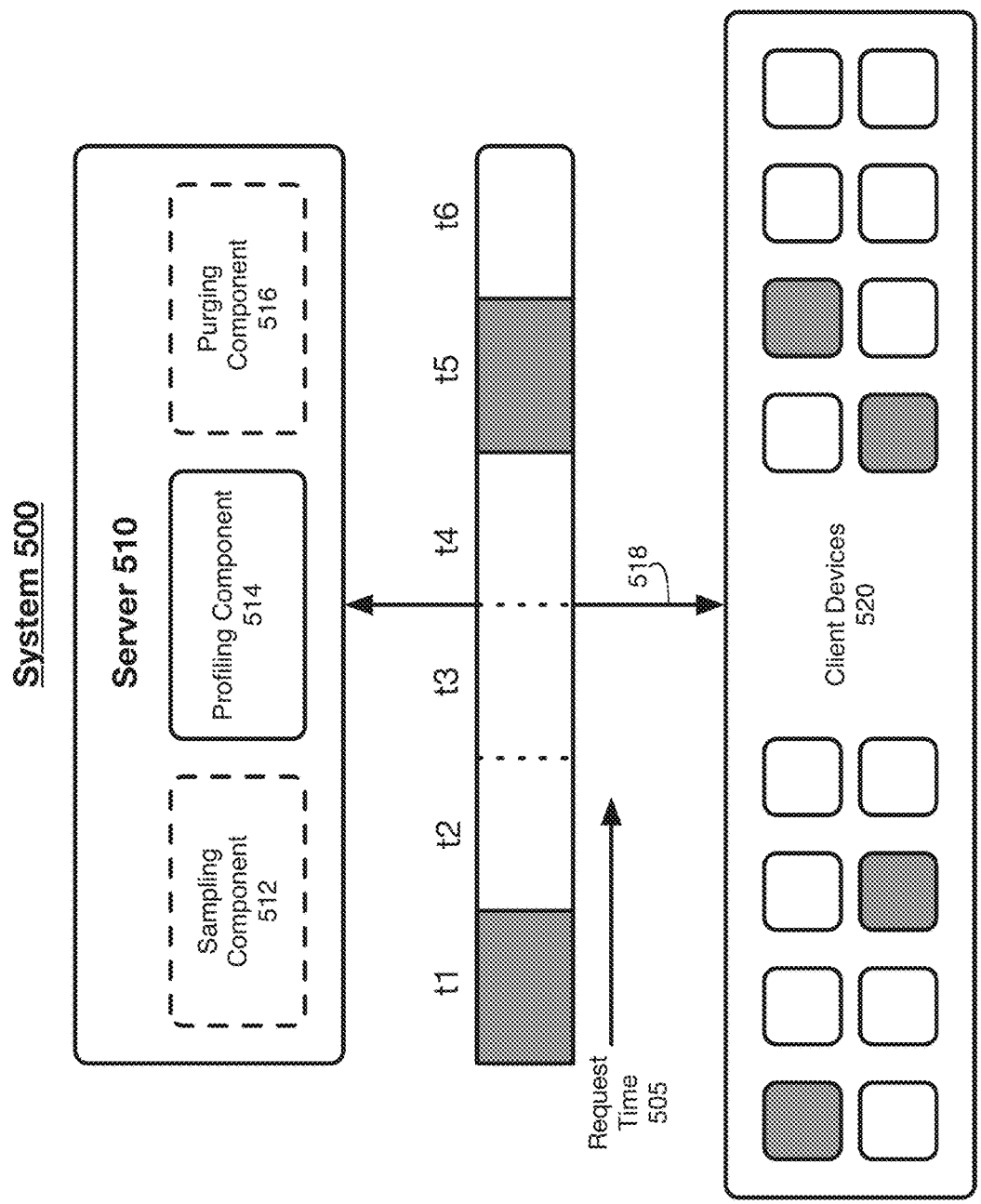
FIG. 5 illustrates an embodiment of a system to identify and purge unused code.

FIG. 5 illustrates a block diagram for a system 500. In one embodiment, the system 500 may comprise one or more components. Although the system 500 shown in FIG. 5 has a limited number of elements in a certain topology, it may be appreciated that the system 500 may include more or less elements in alternate topologies as desired for a given implementation.

In an embodiment, system 500 may include server 510, which be similar to server 110 described above with respect to FIG. 1. Server 510 may include sampling component 512, profiling component 514, and purging component 516, which may also correspond to similarly numbered counterparts of FIG. 1. Interface 518 may connect server 510 to one or more client devices 520.

During a profiling period, profiling component 514 may utilize only portions of client device requests to server 510. Some profiling processes may be resource intensive and may cause some delay during client device requests to server 510. To avoid significant or noticeable delay, profiling component may be operative to select only a subset of time frames of a request for profiling. As illustrated, request time 505 includes time frames t1-t6. While only six time frames are illustrated, it may be appreciated that more or less time frames may be used based upon the type of interface 518, nature of a request, or other factors. In an exemplary embodiment, profiling may be performed during the shaded time frames, t1 and t5. In this manner, only a portion of the total request may be impacted by profiling operations.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 6:
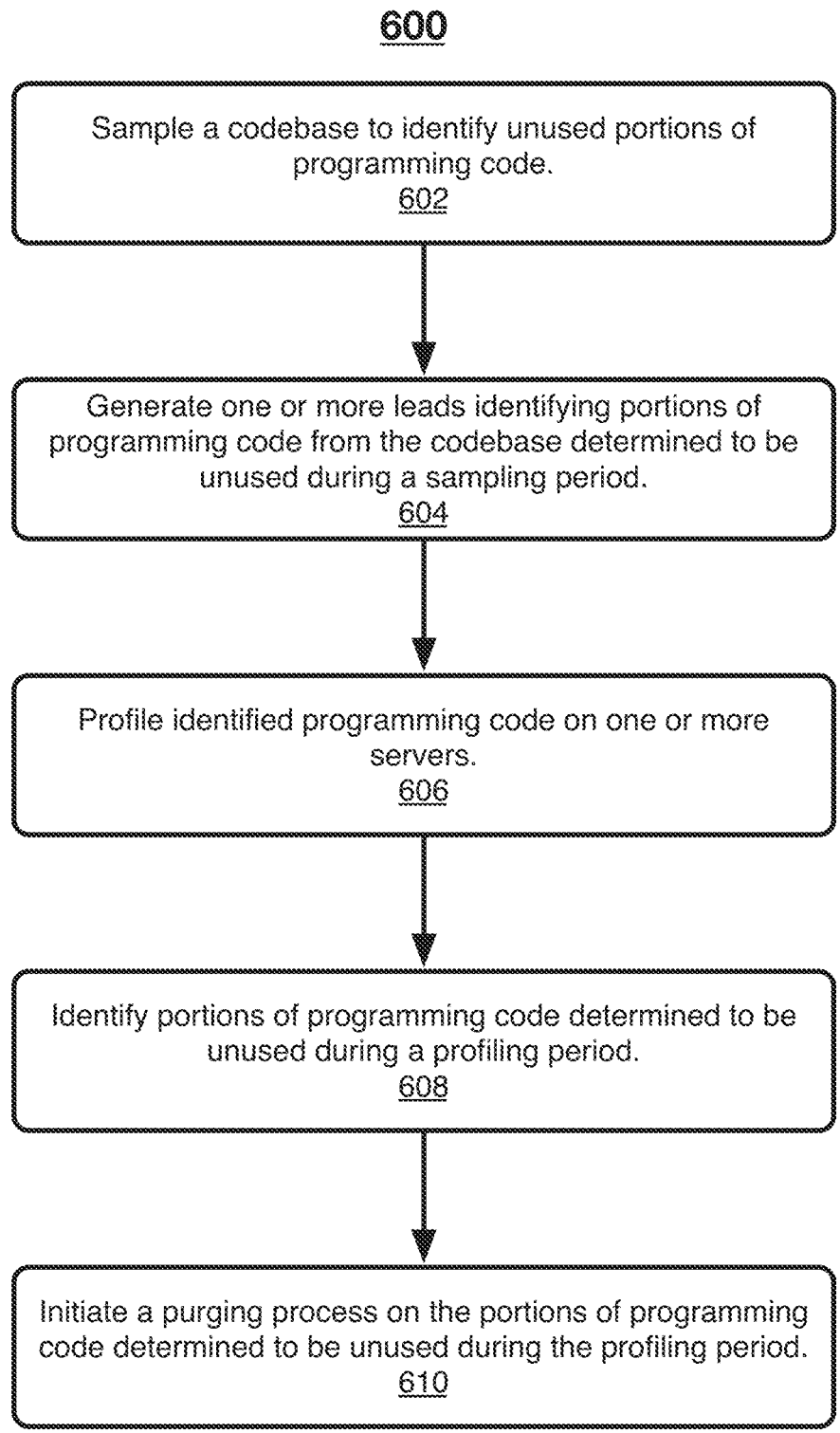
FIG. 6 illustrates a logic flow according to an embodiment.

FIG. 6 illustrates one embodiment of a logic flow 600. The logic flow 600 may be representative of some or all of the operations executed by one or more embodiments described herein. For instance, the logic flow 600 may be representative of some or all of the operations executed by systems 100, 200, or 500, for example.

At 602, a codebase may be sampled to identify unused portions of programming code. A sampling component may be operative to sample a codebase and generate one or more leads identifying portions of programming code from the codebase determined to be unused during a sampling period. Sampling may be performed using one or more known sampling or profiling techniques, for example, flat profiling, call-graph profiling, input-sensitive profiling, event-based profiling, or statistical profiling. The sampling component may use one or more sampling or profiling techniques to generate a series of leads identifying code that has not been recently used. During the sampling period, program behavior may be monitored during periods of time and program activity, including whether portions of code have been used, may be collected. Information that may be collected may include functions called, function call times, or frequency of calls, for example. The embodiments are not limited in this context.

At 604, one or more leads may be generated identifying portions of programming code from the codebase determined to be unused during a sampling period. The sampling component may be configured to detect potential leads for unused code, while ignoring code that has been confirmed as used in the recent past. For example, the sampling component may be configured to, during sampling, skip portions of programing code from the codebase that have been used within a predetermined time period. In other words, if a particular portion of code has recently been confirmed as used, it may be flagged or designated as used for a period of time. A timestamp, timer, or other timing mechanism may be used to indicate how long ago a portion of code was last used. If the code has been used within a predetermined period of time, ranging from seconds to days based upon particular implementations, the sampling component may be configured to skip that portion of code during the sampling procedure. In this manner, the sampling component may identify portions of code where usage is unknown.

At 606, the identified portions of programming code may be profiled on one or more servers. A profiling component may be operative to receive the one or more leads and profile programming code identified therein on one or more servers for a predetermined period of time. The profiling component may be further operative on the processor circuit to identify portions of programming code determined to be unused by the one or more servers based upon requests from one or more client devices during the profiling period. In this manner, profiling component may provide further evidence that particular portions of code are unused.

During profiling, code identified by leads generated by the sampling component may be profiled on one or more servers providing an online service to one or more users. During profiling, code executed on a server based upon a requests from one or more client devices may be monitored over a period of time. The period of time may be predetermined and, in some embodiments, may be automatically or manually adjusted based upon a variety of factors such as the number of requests, the type of code being profiled, and performance criteria such as network speed or preferred network performance. If code is not used during the profiling period, it may be determined that the code is unused and it may be identified as such at 608.

At 610, a purging process may be initiated on the portions of code determined to be unused during the profiling period. A purging component may be operative to receive identification of the portions of programming code determined to be unused during the profiling period and initiate a purging process thereon. The purging process may be configured in a variety of ways. For example, once a portion of code has been identified as unused, the purging component may either automatically purge the code, or may flag the code for manual deletion. Portions of code may be categorized based on a variety of factors such as importance, last used, dependencies, and/or size, among others. Using these categorizations, the purging component may determine whether automatic or manual purging is appropriate. During automatic deletion, the purging component may replace purged code with a marker, or "tombstone," indicating that a portion of code was deleted. In this manner, subsequent review of the code will indicate that code was automatically purged. The marker may include information directing a reviewer to a repository of code. Such information may include identifiers that may be used to locate the code itself or a last-known author of the code. In this manner, if a problem were to arise due to the purging on the code, it may be replaced.

Figure 7:
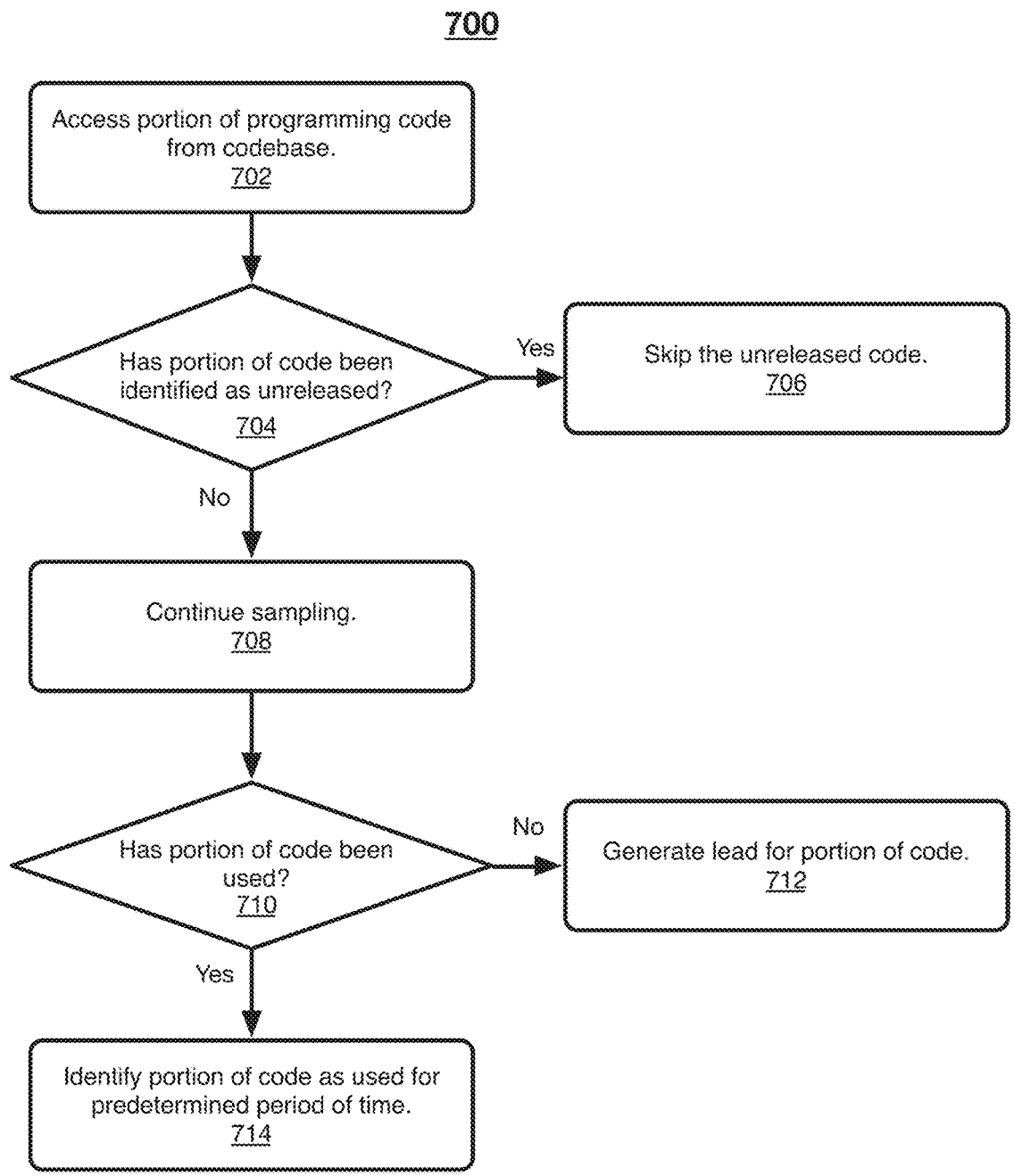
FIG. 7 illustrates a logic flow according to an embodiment.

FIG. 7 illustrates one embodiment of a logic flow 700. The logic flow 700 may be representative of some or all of the operations executed by one or more embodiments described herein. For instance, the logic flow 700 may be representative of some or all of the operations executed by systems 100, 200, or 500, for example.

At 702, a sampling component may access a portion of programming code from a codebase. In some software, code may be deployed into a codebase but not released for public consumption. For example, a web service may deploy code in the codebase for a new feature so that it may be tested internally or while other features are finalized. During this time, the unreleased code may not be accessed by users of the web service. To prevent unreleased code from being identified as a lead for potentially unused code, it may be flagged as unreleased in a manner such that the sampling component skips the unreleased code during sampling.

At 704, the sampling component may determine whether the portion of code has been identified as unreleased. If the code has been identified as unreleased, the sampling component may skip the unreleased code at 706. If the portion of code has not been unreleased, the sampling component may continue the sampling procedure at 708.

At 710, the sampling component may determine whether the portion of code has been used within a predetermined period of time. If the code has not been used, a lead may be generated for the code at 712. If the code has been used, the code may be identified as used for a predetermined period of time at 714.

Figure 8:
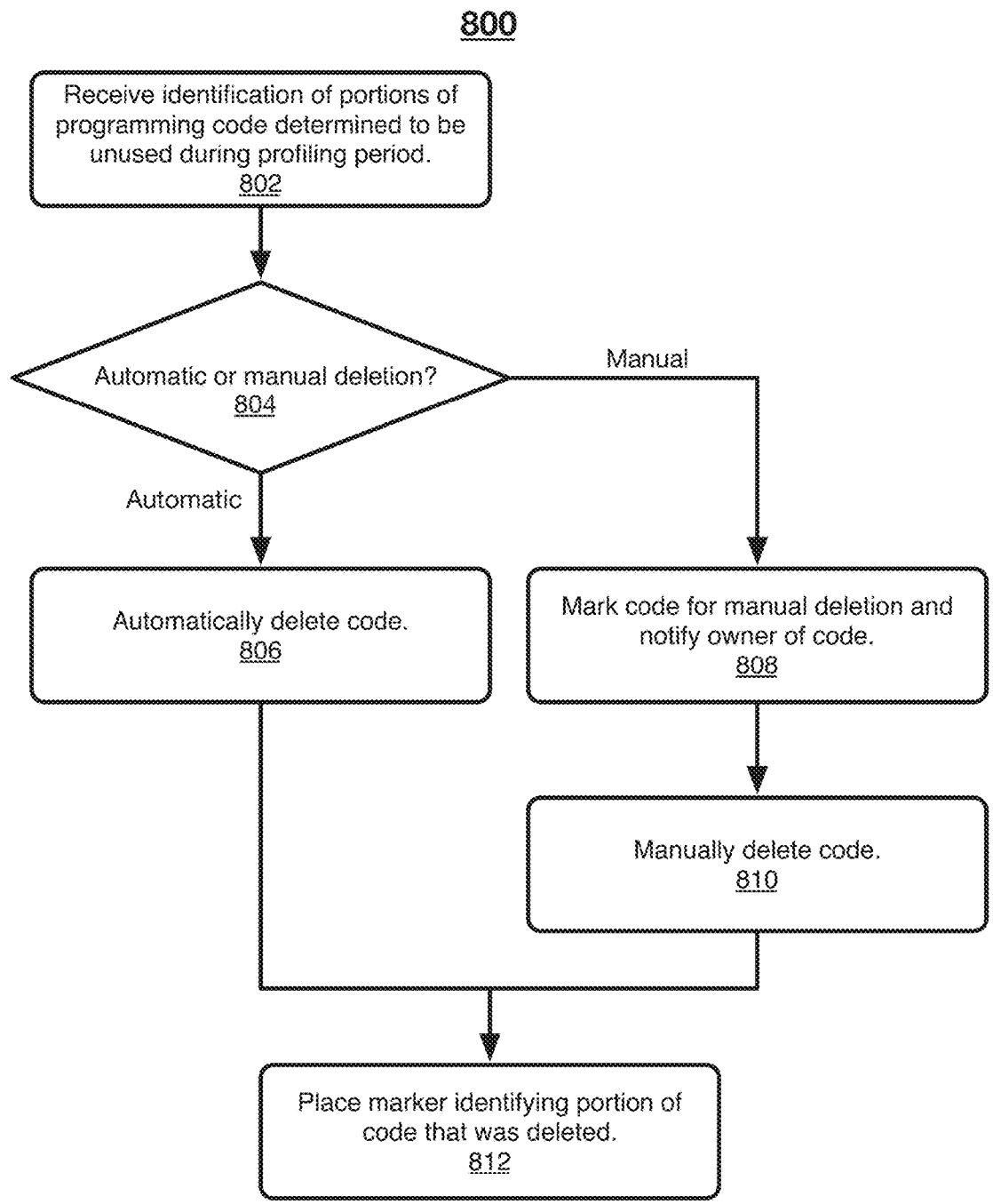
FIG. 8 illustrates a logic flow according to an embodiment.

FIG. 8 illustrates one embodiment of a logic flow 800. The logic flow 800 may be representative of some or all of the operations executed by one or more embodiments described herein. For instance, the logic flow 800 may be representative of some or all of the operations executed by systems 100, 200, or 500, for example.

At 802, a purging component may receive identification of portions of programming code determined to be unused during a profiling period.

At 804, the purging component may determine whether the portion of code should be deleted automatically or manually. For example, portions of code may be categorized based on a variety of factors such as importance, last used, dependencies, and/or size, among others. Using these categorizations, the purging component may determine whether automatic or manual purging is appropriate.

If automatic deletion is determined, the code may be automatically deleted at 806. If manual deletion is determined, the code may be marked for manual deletion at 808. Also at 808, the owner of the code may be notified that manual deletion should be performed, which may occur at 810.

At 812, the purging component may place a marker in the codebase identifying the portion of code that was deleted. In this manner, subsequent review of the code will indicate that code was automatically purged. The marker may include information directing a reviewer to a repository of code. Such information may include identifiers that may be used to locate the code itself or a last-known author of the code. In this manner, if a problem were to arise due to the purging on the code, it may be replaced.

Figure 9:
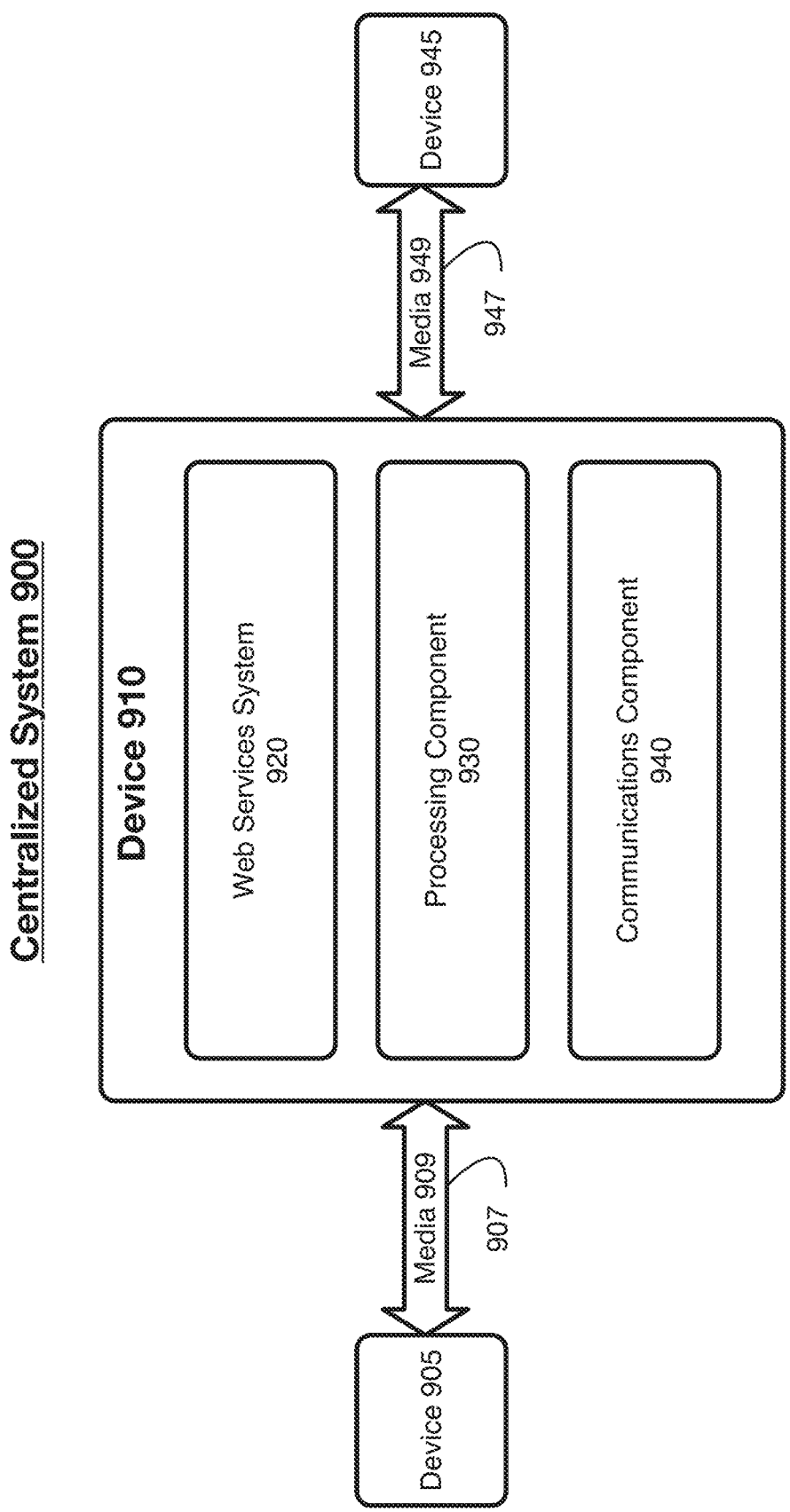
FIG. 9 illustrates an embodiment of a centralized system according to an embodiment.

FIG. 9 illustrates a block diagram of a centralized system 900. The centralized system 900 may implement some or all of the structure and/or operations for the web services system 920 in a single computing entity, such as entirely within a single device 910.

The device 910 may comprise any electronic device capable of receiving, processing, and sending information for the web services system 920. Examples of an electronic device may include without limitation a computer, a personal computer (PC), a desktop computer, a laptop computer, a notebook computer, a netbook computer, a handheld computer, a tablet computer, a server, a server array or server farm, a web server, a network server, an Internet server, a work station, a main frame computer, a supercomputer, a network appliance, a web appliance, a distributed computing system, multiprocessor systems, processor-based systems, wireless access point, base station, subscriber station, radio network controller, router, hub, gateway, bridge, switch, machine, or combination thereof. The embodiments are not limited in this context.

The device 910 may execute processing operations or logic for the web services system 920 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 910 may execute communications operations or logic for the web services system 920 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 909, 949 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 910 may communicate with other devices 905, 945 over a communications media 909, 949, respectively, using communications signals 907, 947, respectively, via the communications component 940. The devices 905, 945, may be internal or external to the device 910 as desired for a given implementation. Examples of devices 905, 945 may include, but are not limited to, a mobile device, a personal digital assistant (PDA), a mobile computing device, a smart phone, a telephone, a digital telephone, a cellular telephone, ebook readers, a handset, a one-way pager, a two-way pager, a messaging device, consumer electronics, programmable consumer electronics, game devices, television, digital television, or set top box.

For example, device 905 may correspond to a client device such as a phone used by a user. Signals 907 sent over media 909 may therefore comprise communication between the phone and the web services system 920 in which the phone transmits a request and receives a web page in response.

Device 945 may correspond to a second user device used by a different user from the first user, described above. In one embodiment, device 945 may submit information to the web services system 920 using signals 947 sent over media 949 to construct an invitation to the first user to join the services offered by web services system 920. For example, if web services system 920 comprises a social networking service, the information sent as signals 947 may include a name and contact information for the first user, the contact information including phone number or other information used later by the web services system 920 to recognize an incoming request from the user. In other embodiments, device 945 may correspond to a device used by a different user that is a friend of the first user on a social networking service, the signals 947 including status information, news, images, or other social-networking information that is eventually transmitted to device 905 for viewing by the first user as part of the social networking functionality of the web services system 920.

Figure 10:
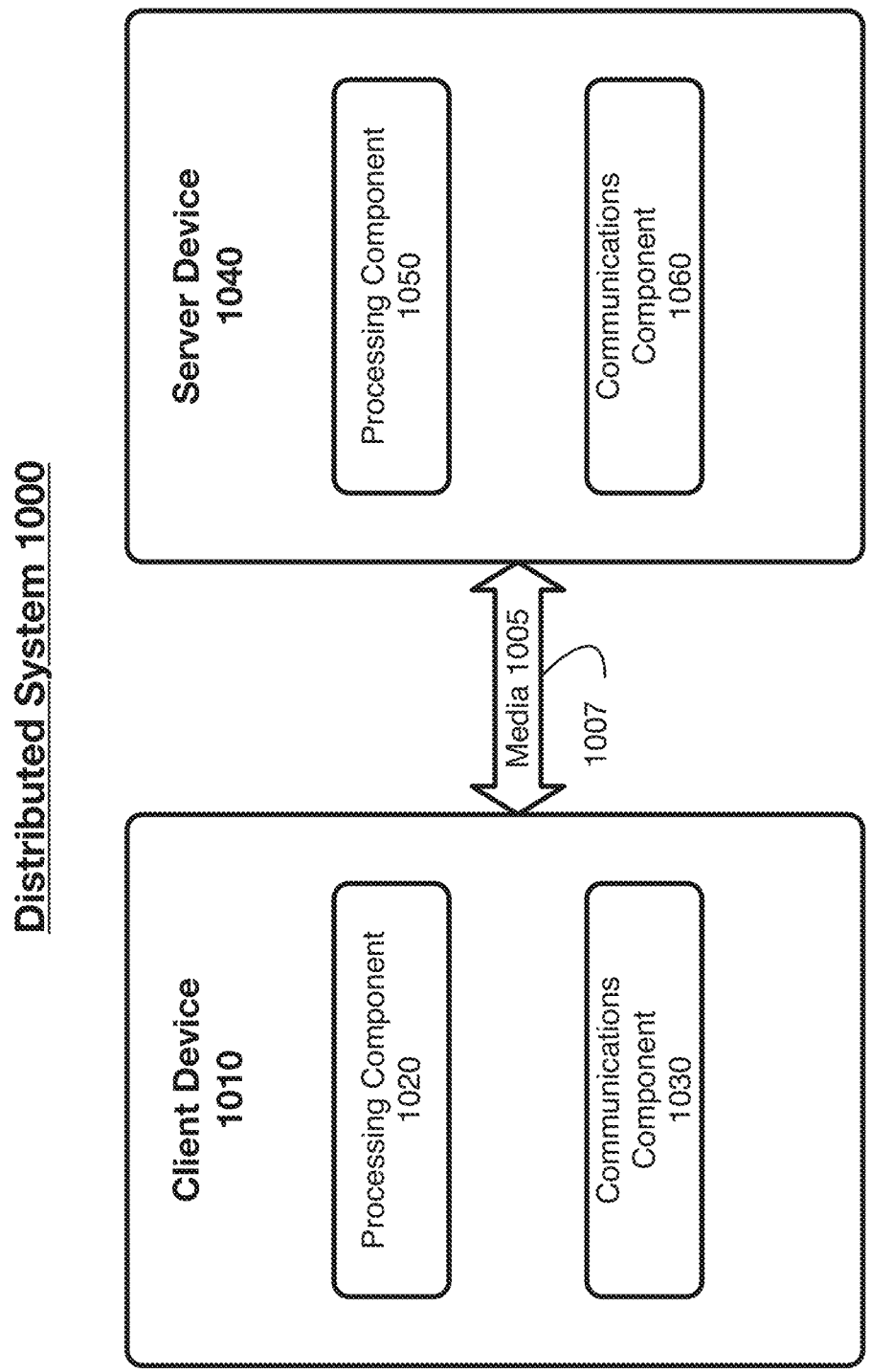
FIG. 10 illustrates an embodiment of a distributed system according to an embodiment.

FIG. 10 illustrates a block diagram of a distributed system 1000. The distributed system 1000 may distribute portions of the structure and/or operations for the disclosed embodiments across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a client device 1010 and a server device 1040. In general, the client device 1010 and the server device 1040 may be the same or similar to device 910 as described with reference to FIG. 9. For instance, the client device 1010 and the server device 1040 may each comprise a processing component 1020, 1050 and a communications component 1030, 1060 which are the same or similar to the processing component 930 and the communications component 940, respectively, as described with reference to FIG. 9. In another example, the devices 1010 and 1040 may communicate over a communications media 1005 using media 1005 via signals 1007.

The client device 1010 may comprise or employ one or more client programs that operate to perform various methodologies in accordance with the described embodiments. In one embodiment, for example, the client device 1010 may implement some steps described with respect client devices described in the preceding figures.

Figure 11:
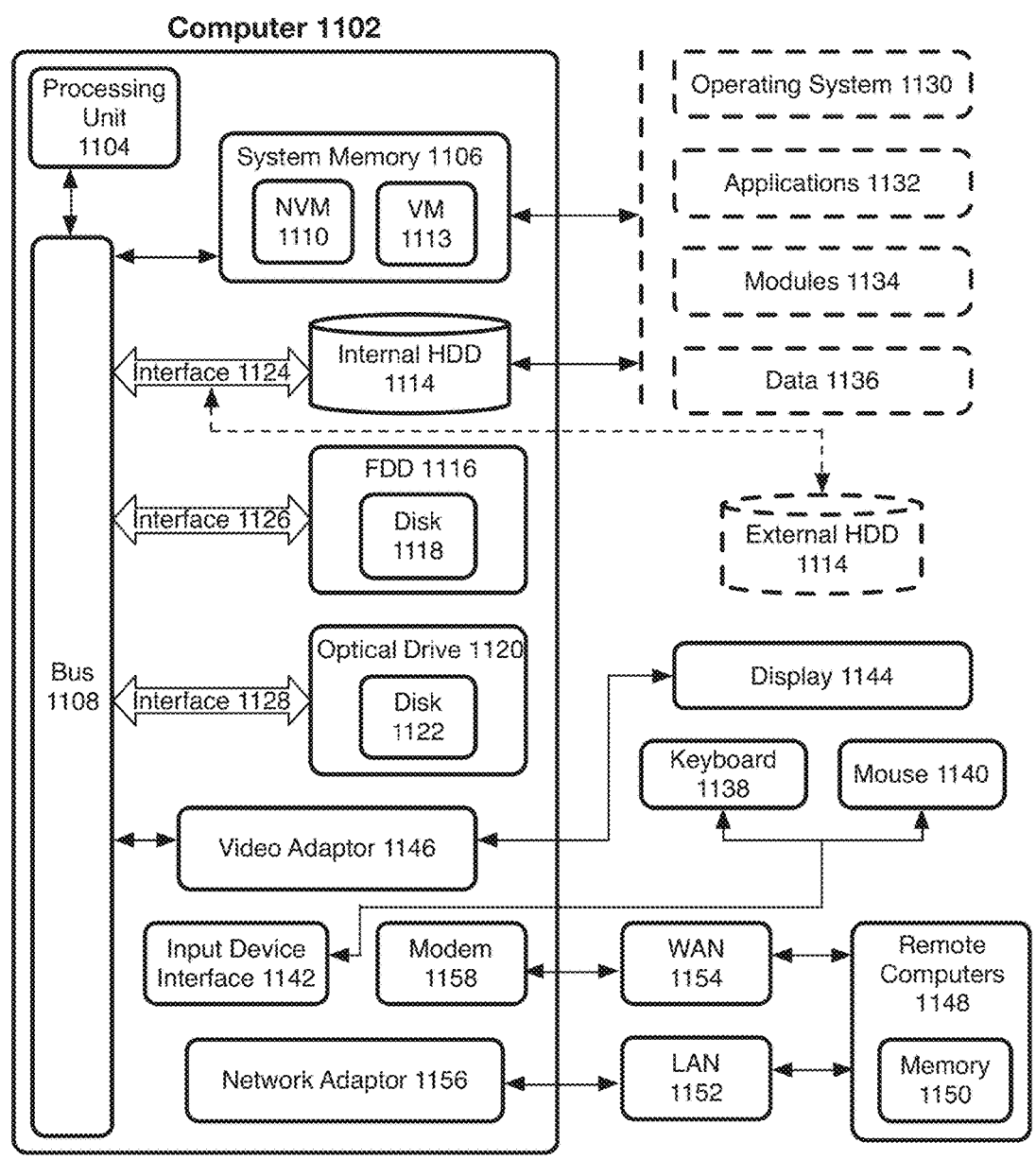
FIG. 11 illustrates an embodiment of a computing architecture.

The server device 1040 may comprise or employ one or more server programs that operate to perform various methodologies in accordance with the described embodiments. In one embodiment, for example, the server device 1040 may implement some steps described with respect to server devices described in the preceding figures FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1113. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM, DVD, or Blu-ray). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1113, including an operating system 1130, one or more application programs 1132, other program modules 1134, and program data 1136. In one embodiment, the one or more application programs 1132, other program modules 1134, and program data 1136 can include, for example, the various applications and/or components to implement the disclosed embodiments.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A display 1144 is also connected to the system bus 1108 via an interface, such as a video adaptor 1146. The display 1144 may be internal or external to the computer 1102. In addition to the display 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
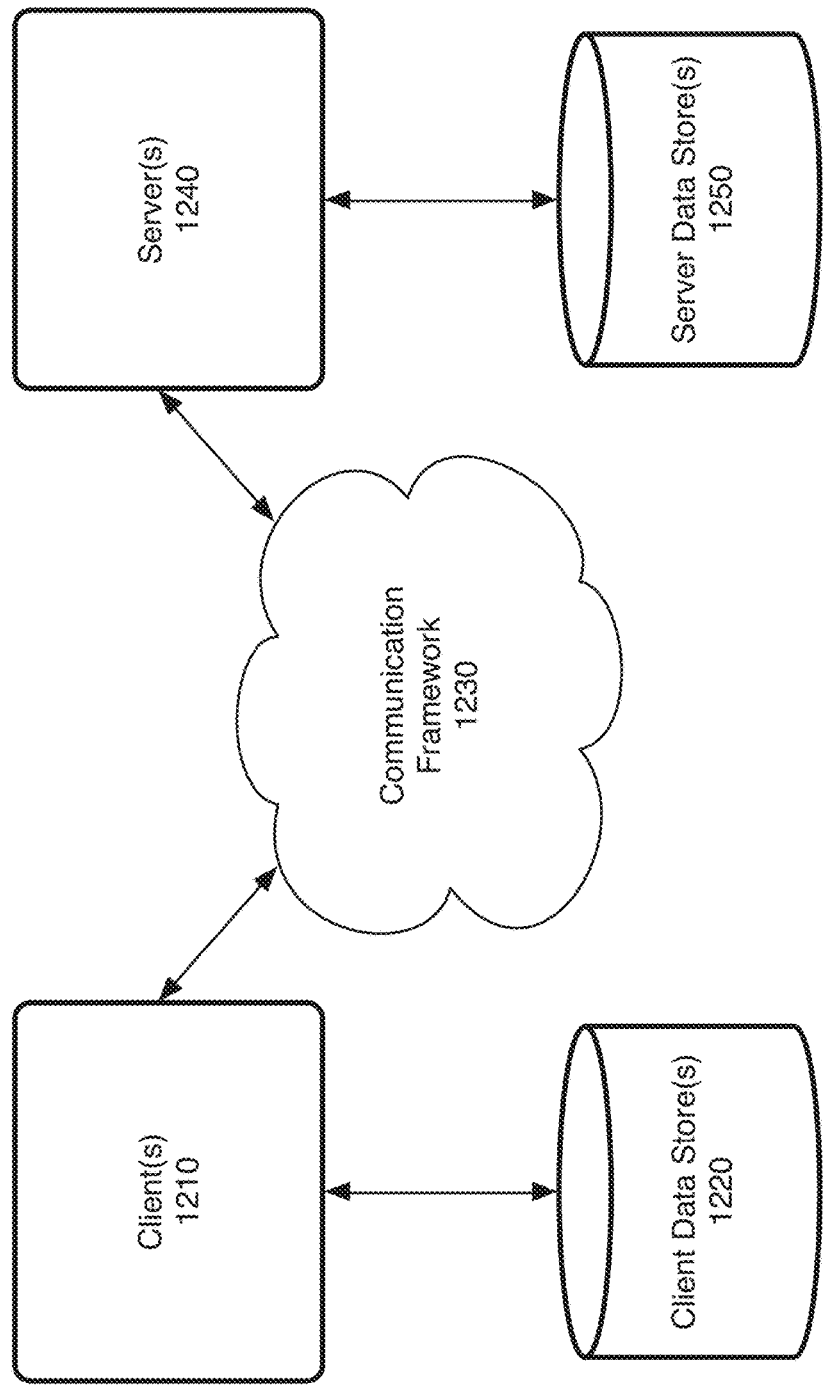
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1210 and servers 1240. The clients 1210 may implement the client device 1010, for example. The servers 1240 may implement the server device 1040, for example. The clients 1210 and the servers 1240 are operatively connected to one or more respective client data stores 1220 and server data stores 1250 that can be employed to store information local to the respective clients 1210 and servers 1240, such as cookies and/or associated contextual information.

The clients 1210 and the servers 1240 may communicate information between each other using a communication framework 1230. The communications framework 1230 may implement any well-known communications techniques and protocols. The communications framework 1230 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1230 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1210 and the servers 1240. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
   a processor circuit on a device;
   a storage component configured to store a codebase including one or more portions of programming code;
   a sampling component operative on the processor circuit to monitor program behavior during a sampling period of program activity to identify portions of programming code from the codebase determined to be unused during the sampling period;
   a profiling component operative on the processor circuit to determine a subset of the identified portions of programming code that is unused during a profiling period; and
   a purge component operative on the processor circuit to determine to initiate a purging process on the subset of the identified portions of programming code that is unused during the profiling period, to select between an automatic purging process and a manual purging process based on a categorization of the code in the subset of identified portions of the programming code, to associate a gate with the subset of the identified portions of programming code that is unused during the profiling period, the gate configured to identify use of the subset of the identified portions of programming code that is unused during the profiling period during a predetermined time period; and initiating the determined automatic or manual purging process on the subset of programming code determined to be unused during the profiling period when the predetermined time period expires.

2. The apparatus of claim 1, the sampling component is further operative on the processor circuit to, during sampling, skip portions of programing code from the codebase that have been used within a predetermined time period.

3. The apparatus of claim 1, the profiling component is further operative on the processor circuit to perform profiling during a subset of time frames of a client request.

4. The apparatus of claim 1, the purge component is further operative to automatically delete the subset of the identified portions of programming code that is unused during the profiling period.

5. The apparatus of claim 1, the purge component is further operative to flag the subset of the identified portions of programming code that is unused during the profiling period for manual deletion.

6. The apparatus of claim 1, the sampling component is further operative on the processor circuit to skip programming code that has been identified as unreleased.

7. The apparatus of claim 1, the purge component is further operative to add a marker in place of deleted programming code, the marker identifying the programming code that was deleted and comprising at least one of an identifier indicating a location of the deleted programming code in a repository or an identifier of a last-known author of the deleted programming code.

8. A computer-implemented method, comprising:
identifying portions of programming code that have not been identified as being used;
profiling the identified portions of programming code to monitor execution of the code during a profiling period to determine a subset of programming code that is unused during the profiling period;
determining to initiate a purging process on the subset of the identified portions of programming code that is unused during the profiling period, and to select between an automatic purging process and a manual purging process based on a categorization of the code in the subset of the programming code;
associating a gate with the subset of the identified portions of programming code that is unused during the profiling period;
configuring the gate to identify use of the subset of the identified portions of programming code that is unused during the profiling period during a predetermined time period; and
initiating the determined automatic or manual purging process on the subset of programming code determined to be unused during the profiling period when the predetermined time period expires.

9. The computer-implemented method of claim 8, further comprising skipping portions of programing code that have been used within a predetermined time period.

10. The computer-implemented method of claim 8, further comprising performing profiling during a subset of time frames of a client request.

11. The computer-implemented method of claim 8, the automatic purging process comprising automatically deleting the subset of programming code determined to be unused during the profiling period.

12. The computer-implemented method of claim 8, the manual purging process comprising flagging the subset of programming code determined to be unused during the profiling period for manual deletion.

13. The computer-implemented method of claim 8, further comprising skipping programming code that has been identified as unreleased.

14. The computer-implemented method of claim 8, the automatic purging process further comprising adding a marker in place of deleted programming code, the marker identifying the programming code that was deleted and comprising at least one of an identifier indicating a location of the deleted programming code in a repository or an identifier of a last-known author of the deleted programming code.

15. An article comprising at least one non-transitory computer-readable storage medium comprising instructions that, when executed, cause a system to:
identify portions of programming code that have not been identified as being used;
profile the identified portions of programming code to monitor execution of the code during a profiling period to determine a subset of programming code that is unused during the profiling period;
determine to initiate a purging process on the subset of the identified portions of programming code that is unused during the profiling period, and to select between an automatic purging process and a manual purging process based on a categorization of the code in the subset of the programming code;
associate a gate with the subset of the identified portions of programming code that is unused during the profiling period;
configure the gate to identify use of the subset of the identified portions of programming code that is unused during the profiling period during a predetermined time period; and
initiate the determined automatic or manual purging process on the subset of programming code determined to be unused during the profiling period when the predetermined time period expires.

16. The article of claim 15, comprising further instructions that, when executed, cause a system to skip portions of programing code that have been used within a predetermined time period.

17. The article of claim 15, comprising further instructions that, when executed, cause a system to perform profiling during a subset of time frames of a client request.

18. The article of claim 15, the automatic purging process comprising automatically deleting the subset of programming code determined to be unused during the profiling period.

19. The article of claim 15, the manual purging process comprising flagging the subset of programming code determined to be unused during the profiling period for manual deletion.

20. The article of claim 15, comprising further instructions that, when executed, cause a system to skip programming code that has been identified as unreleased.

21. The article of claim 15, the automatic purging process further comprising adding a marker in place of deleted programming code, the marker identifying the programming code that was deleted and comprising at least one of an identifier indicating a location of the deleted programming code in a repository or an identifier of a last-known author of the deleted programming code.

\* \* \* \* \*